(12) United States Patent
Shiraki

(10) Patent No.: US 9,146,971 B2
(45) Date of Patent: Sep. 29, 2015

(54) MANAGEMENT DEVICE AND COMPUTER-READABLE STORAGE MEDIUM STORING COMPUTER-READABLE INSTRUCTIONS

(71) Applicant: Tomomi Shiraki, Nagoya (JP)

(72) Inventor: Tomomi Shiraki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 178 days.

(21) Appl. No.: 13/801,589

(22) Filed: Mar. 13, 2013

(65) Prior Publication Data

US 2013/0262448 A1    Oct. 3, 2013

(30) Foreign Application Priority Data

Mar. 29, 2012  (JP) ................................. 2012-077414

(51) Int. Cl.
*G06F 17/30* (2006.01)

(52) U.S. Cl.
CPC ...... *G06F 17/30554* (2013.01); *G06F 17/3056* (2013.01); *G06F 17/30333* (2013.01); *G06F 2216/17* (2013.01)

(58) Field of Classification Search
None
See application file for complete search history.

(56) References Cited

U.S. PATENT DOCUMENTS

| | | | | |
|---|---|---|---|---|
| 2003/0115316 A1* | 6/2003 | Yang-Huffman | ............ | 709/224 |
| 2004/0039745 A1* | 2/2004 | Evans et al. | ................... | 707/100 |
| 2005/0188067 A1 | 8/2005 | Kawashima | | |
| 2007/0156880 A1* | 7/2007 | Kim | .............................. | 709/223 |
| 2007/0168526 A1 | 7/2007 | Ueno | | |
| 2007/0198568 A1* | 8/2007 | Luo et al. | ....................... | 707/102 |
| 2008/0301143 A1 | 12/2008 | Kim | | |
| 2011/0179031 A1 | 7/2011 | Sekiguchi et al. | | |
| 2011/0270966 A1 | 11/2011 | Zhou | | |
| 2013/0027727 A1* | 1/2013 | Nakai | .......................... | 358/1.13 |
| 2013/0227064 A1 | 8/2013 | Shiraki | | |

FOREIGN PATENT DOCUMENTS

| | | |
|---|---|---|
| JP | 2007-174235 | 7/2007 |
| JP | 2008-071197 | 3/2008 |
| JP | 2013-182305 A | 9/2013 |

OTHER PUBLICATIONS http://www.nec.co.jp/ip88n/s24_sw/html/cfguide2/cfguide2-chap21-04.html, "Summary of MIBs", printed Jan. 31, 2013.

(Continued)

*Primary Examiner* — Robert Beausoliel, Jr.
*Assistant Examiner* — Pedro J Santos
(74) *Attorney, Agent, or Firm* — Scully, Scott, Murphy & Presser, P.C.

(57) ABSTRACT

A management device transmits to a target device a first GETNEXT request comprising a first group of Ma-combined IDs. Each combined ID is a combination of a target ID and one of Ma-index values. Each index value has a first value in its highest digit(s) and one of consecutive values in its lowest digit. The management device obtains Ma-partial information and a second group of an Ma-combined IDs corresponding to the Ma-partial information, identifies a greatest combined ID having a greatest index value from the second group, and transmits a second GETNEXT request comprising Mb-combined IDs comprising the identified greatest combined ID. Each combined ID is a combination of the target ID and one of Mb-index values. Each index value has a second value different from the second value in its highest digit(s) and one of consecutive values in its lowest digit.

16 Claims, 9 Drawing Sheets

(56) References Cited

OTHER PUBLICATIONS

Rose, M. et al., "Structure and Identification of Management Information for TCP/IP-based Internets", Hughes, LAN Systems, May 1990.

Case, J. et al., "A Simple Network Management Protocol (SNMP)", MIT Laboratory for Computer Science, May 1990.

Rose, M. et al., "Concise MIB Definitions", Hughes LAN Systems, Mar. 1991.

U.S. Office Action dated Mar. 12, 2015 issued in related U.S. Appl. No. 13/775,905.

* cited by examiner

Fig.4
EXAMPLE OF OBTAINING ONE-DIMENSIONAL INDEX INFORMATION
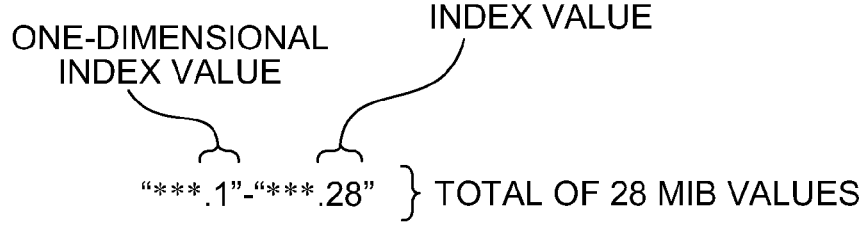
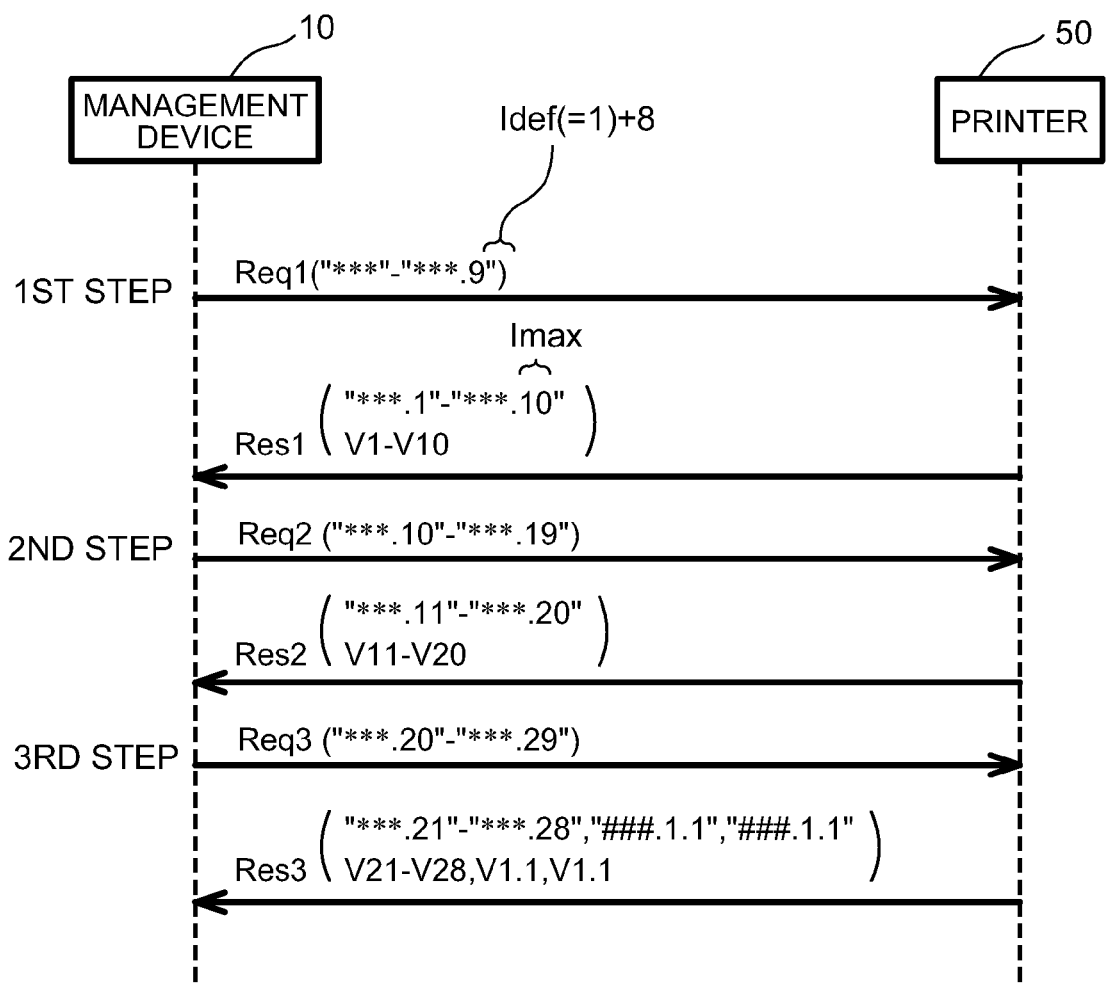

(VARIATION OF FIRST ILLUSTRATIVE EMBODIMENT)

EXAMPLE OF OBTAINING TWO-DIMENSIONAL INDEX INFORMATION

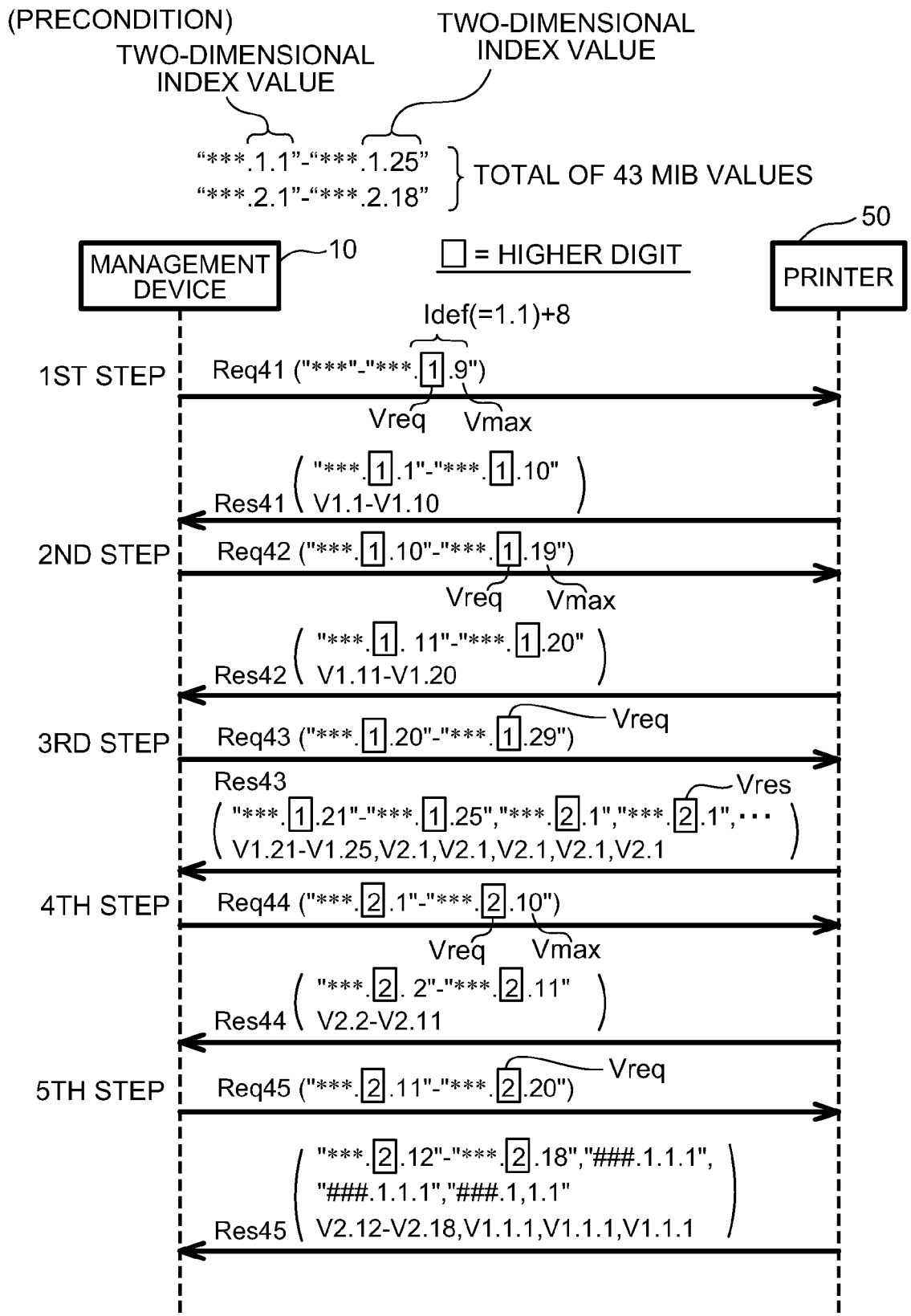

MANAGEMENT DEVICE AND COMPUTER-READABLE STORAGE MEDIUM STORING COMPUTER-READABLE INSTRUCTIONS

CROSS-REFERENCE TO RELATED APPLICATION

This application claims priority from Japanese Patent Application No. 2012-077414, filed on Mar. 29, 2012, which is incorporated herein by reference.

TECHNICAL FIELD

Aspects of the disclosure relate to a management device that manages a target device. In addition, aspects of the disclosure relate to a computer-readable storage medium storing computer-readable instructions that manage a target device. Further, aspects of the disclosure relate to a method that manages a target device.

BACKGROUND

In a known technique, for example, a plurality of pieces of information are obtained from a device at once by which a GETNEXT request or a GETBULK request including object identifiers ("OIDs") for obtaining the plurality of pieces of information is transmitted.

SUMMARY

Aspects of the disclosure provide for a technique for obtaining target information efficiently by using a different technique from the known technique, and more particularly, a technique for obtaining each partial target information efficiently when the target information includes a plurality of pieces of partial target information corresponding to a plurality of two- or more-dimensional index values.

According to one or more aspects of the disclosure, a management device may comprise: a processor; a memory storing computer-readable instructions. The computer-readable instructions, when executed by the processor, may cause the management device to perform: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; obtaining, as the result of the transmission of the first GETNEXT request, Ma number of pieces of partial target information and a second group of an Ma number of combined IDs corresponding to the Ma number of pieces of partial target information from the target device; identifying, using the obtained second group of the Ma number of combined IDs, a greatest combined ID having a greatest K-dimensional index value from the obtained second group of the Ma number of combined IDs; preparing an Mb number of combined IDs comprising the identified greatest combined ID, wherein Mb is an integer of 2 or greater, each of the Mb number of combined IDs is a combination of the target ID and one of Mb number of K-dimensional index values having K number of digits, each of the Mb number of K-dimensional index values has a second value in the highest K-1 number of its K number of digits and one of consecutive values in its lowest digit, and the second value is different from the first value; and transmitting to the target device a second GETNEXT request comprising the prepared Mb number of combined IDs.

According to one or more aspects of the disclosure, a management device may comprise: a processor; a memory storing computer-readable instructions. The computer-readable instructions, when executed by the processor, may cause the management device to perform: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; determining whether a result of the transmission of the first GETNEXT request is a first case in which Ma pieces of partial target information obtained from the target device include specific partial target information corresponding to a specific combined ID that is a combination of the target ID and a specific index value having, in the highest K-1 number of its K number of digits, a second value that is different from the first value; preparing, after it is determined that the result of the transmission of the first GETNEXT request is the first case, an Mb number of combined IDs, wherein Mb is an integer of 2 or greater, each of the Mb number of combined IDs is a combination of the target ID and one of Mb number of K-dimensional index values having K number of digits, each of the Mb number of K-dimensional index values has the second value in a highest K-1 number of its K number of digits and one of consecutive index values in its lowest digit; and transmitting to the target device a second GETNEXT request comprising the prepared Mb number of combined IDs.

According to one or more aspects of the disclosure, a computer-readable storage medium may store computer-readable instructions. The computer-readable instructions, when executed, may cause a processor to perform: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; obtaining, as the result of the transmission of the first GETNEXT request, Ma number of pieces of partial target information and a second group of an Ma number of combined IDs corresponding to the Ma number of pieces of partial target information from the target device; identifying, using the obtained second group of the Ma number of combined IDs, a greatest combined ID having a greatest K-dimensional index value from the obtained second group of the Ma number of combined IDs; preparing an Mb number of combined IDs comprising the identified greatest combined ID, wherein Mb is an integer of 2 or greater, each of the Mb number of combined IDs is a combination of the target ID and one of Mb number of K-dimensional index values having K number of digits, each of the Mb number of K-dimensional index values has a second value in the highest K-1 number of its K number of digits and one of consecutive values in its lowest digit, and the second value is different from the first value; and transmitting to the target device a second GETNEXT request comprising the prepared Mb number of combined IDs.

According to one or more aspects of the disclosure, a computer-readable storage medium may store computer-readable instructions. The computer-readable instructions, when executed, may cause a processor to perform: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; determining whether a result of the transmission of the first GETNEXT request is a first case in which Ma pieces of partial target information obtained from the target device include specific partial target information corresponding to a specific combined ID that is a combination of the target ID and a specific index value having, in the highest K-1 number of its K number of digits, a second value that is different from the first value; preparing, after it is determined that the result of the transmission of the first GETNEXT request is the first case, an Mb number of combined IDs, wherein Mb is an integer of 2 or greater, each of the Mb number of combined IDs is a combination of the target ID and one of Mb number of K-dimensional index values having K number of digits, each of the Mb number of K-dimensional index values has the second value in a highest K-1 number of its K number of digits and one of consecutive index values in its lowest digit; and transmitting to the target device a second GETNEXT request comprising the prepared Mb number of combined IDs.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, and various objects, features, and advantages thereof, reference now is made to the following descriptions taken in connection with the accompanying drawings.

FIG. 4 is a sequence diagram depicting an example of obtaining one-dimensional index information in the first illustrative embodiment according to one or more aspects of the disclosure.

FIG. 9 is a sequence diagram depicting an example of obtaining two-dimensional index information in the second illustrative embodiment according to one or more aspects of the disclosure.

DETAILED DESCRIPTION OF EMBODIMENTS

Figure 1:
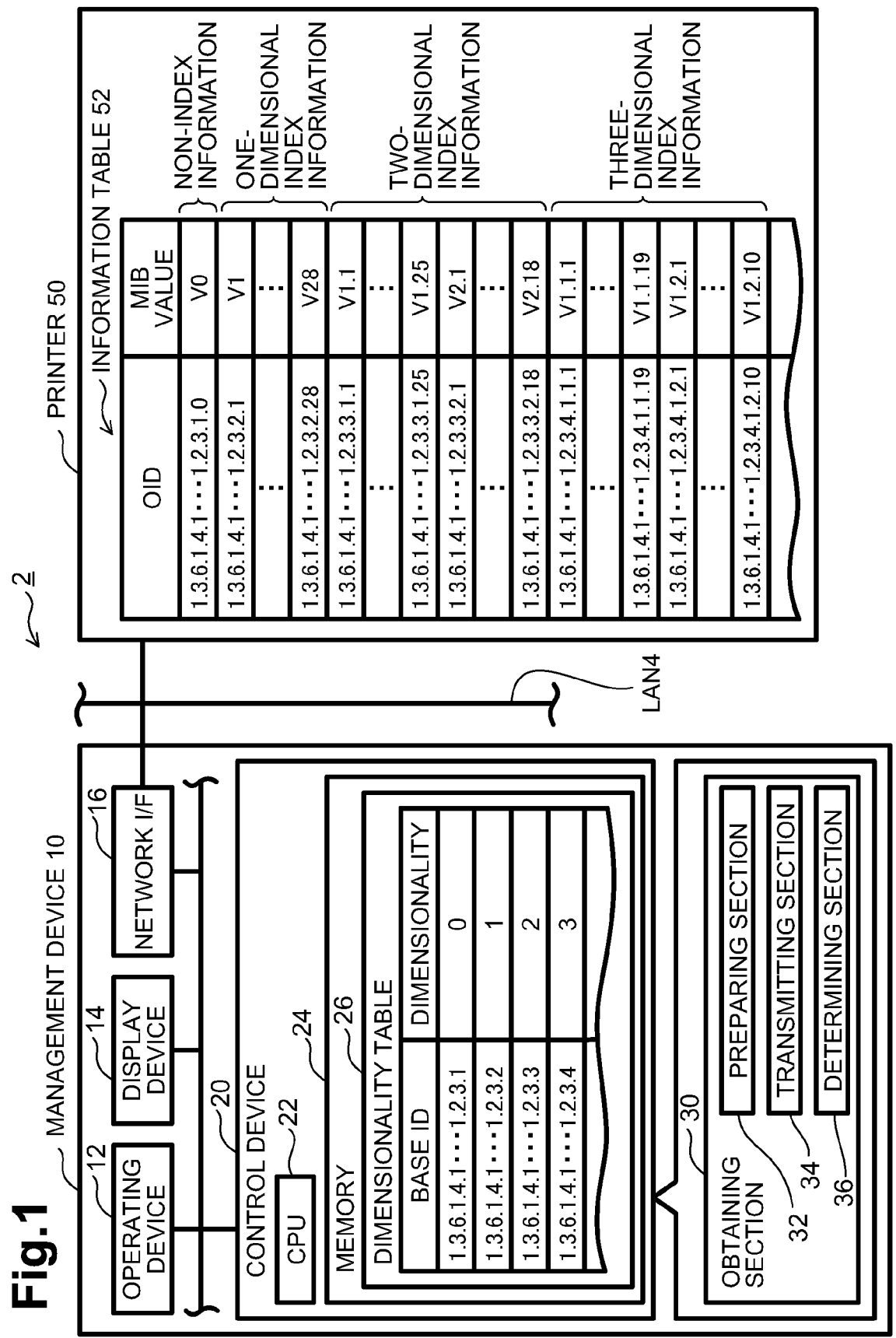
FIG. 1 depicts a configuration of a management system in a first illustrative embodiment according to one or more aspects of the disclosure.

First Illustrative Embodiment (System Configuration) As depicted in FIG. 1, a management system 2 comprises a management device 10 and a printer 50. Although the management system 2 comprises a single printer 50 in FIG. 1, the management system 2 may comprises a plurality of printers 50. The management device 10 and the printer 50 are connected to a local-area network ("LAN") 4. Therefore, the management device 10 and the printer 50 are configured to communicate with each other via the LAN 4.

The management device 10 is, for example, a personal computer ("PC") or a server. The management device 10 is configured to obtain various information from the printer 50 and to perform a management process (see FIG. 2) for displaying the obtained information. By doing so, the management device 10 manages the target printer 50. In this example, the management device 10 and the printer 50 are configured to perform data communications therebetween in accordance with the Simple Network Management Protocol ("SNMP"). That is, the management device 10 functions as an SNMP manager and the printer 50 functions as an SNMP agent.

(Configuration of Management Device 10) The management device 10 comprises an operating device 12, a display device 14, a network interface ("I/F") 16, and a control device 20. The operating device 12 comprises a keyboard and a mouse. A user is allowed to input various instructions into the management device 10 by operating the operating device 12. The display device 14 comprises a display for displaying various information thereon. The network interface 16 is configured to be connected to the LAN 4.

The control device 20 comprises a central-processing unit ("CPU") 22 and a memory 24. The CPU 22 is configured to perform various processes in accordance with programs stored in the memory 24. The programs stored in the memory 24 comprise a management program for performing the management process. In this illustrative embodiment, the management program complies with the Simple Network Management Protocol version 1 ("SNMPv1"). In other embodiments, for example, the management program may comply with SNMP version 2 ("SNMPv2") or SNMP version 3 ("SNMPv3").

The management program is supplied, for example, by a vendor of the printer 50. The management program is, for example, stored in a medium shipped together with the printer 50. The user installs the management program on a device, e.g., a PC, from the medium. By doing so, the management device 10 configured to perform the management process is implemented. In other embodiments, for example, the user may install the management program on a device, e.g., the PC, by downloading the management program from a server offered by the vendor of the printer 50.

A function of an obtaining section 30 is implemented by the performance of process by the CPU 22 in accordance with the management program. The obtaining section 30 comprises a preparing section 32, a transmitting section 34, and a determining section 36. The management program comprises a dimensionality table 26. Therefore, in accordance with the installation of the management program on the management device 10, the dimensionality table 26 is stored in the memory 24. The dimensionality table 26 will be further described in detail below.

(Configuration of Printer 50) The printer 50 is configured to perform printing upon receipt of a print instruction from a device (not depicted), e.g., the PC. The printer 50 stores an information table 52. The information table 52 comprises object identifiers ("OIDs") and management information base ("MIB") values that are associated with each other, respectively.

(MID and OID) The printer 50 is configured to store various information in a tree structure (i.e., a hierarchy). The information to be stored in the printer 50 comprises, for example, an error history of the printer 50, a status of the printer 50 (e.g., printing or standby), setting values related to the user (e.g., a password), setting values related to printing (e.g., a default print resolution). The tree-structured information base is referred to as the "MIB".

In the MIB hierarchy, a conception of an object is used and a number is assigned to each object. In this example, is assumed that there are a first object (e.g., a number "1"), a second object (e.g., a number "3"), a third object (e.g., a number "6"), . . . , and a lowermost object (e.g., a number "1") from uppermost level to lowermost level. Hereinafter, " . . . " represents the omission of something (e.g., one or more objects). In this case, a path for identifying information corresponding to the lowermost object is represented by "1.3.6 . . . 1". In this illustrative embodiment, the path identified in accordance with the MIB hierarchy is referred to as a "base identifier ("ID")". Information corresponding to a base ID is referred to as "a piece of information".

In the MIB hierarchy, when a piece of information corresponding to a base ID comprises a plurality of pieces of partial information, an index value is used to identify each partial information. For example, when a piece of information corresponding to the base ID "1.3.6 . . . 1" comprises first and second partial information, an index value "1" may be assigned to the first partial information and an index value "2" may be assigned to the second partial information. In this case, an ID corresponding to the first partial information is represented by "1.3.6 . . . 1.1" that is a combination of the base ID "1.3.6 . . . 1" and the index value "1". Similarly, an ID corresponding to the second partial information is represented by a combination "1.3.6 . . . 1.2" of the base ID "1.3.6 . . . 1" and the index value "2". In this illustrative embodiment, the combined ID of the base ID and the index value is also referred to as the "OID", and the partial information corresponding to the OID is referred to as the "MIB value". A piece of information including a plurality of pieces of partial information (i.e., a plurality of MIB values) is referred to as "index information".

For example, it is assumed that index information corresponding to the base ID "1.3.6 . . . 1" represents an error history of the printer 50. When a first error occurs, the printer 50 is configured to store a value representing the error, as a MIB value corresponding to an OID "1.3.6 . . . 1.1" including an index value "1". When a second error occurs, the printer 50 is configured to store a value representing the error, as a MIB value corresponding to an OID "1.3.6 . . . 1.2" including an index value "2". As described above, the printer 50 is configured to store a plurality of MIB values accumulatively in association with a base ID by using the index information.

In addition, for example, when a piece of information corresponding to the base ID "1.3.6 . . . 1" does not comprise a plurality of pieces of partial information (i.e., when the information is represented by a single value), an ID corresponding to the information is represented by "1.3.6 . . . 1.0" that is a combination of the base ID "1.3.6 . . . 1" and a default value "0". In this illustrative embodiment, the combined ID of the base ID and the default value is also referred to as the "OID". A piece of information not including a plurality of pieces of partial information is referred to as "non-index information".

The printer 50 stores the non-index information and the index information in the information table 52 in association with respective OIDs. For example, a piece of information corresponding to a base ID "1.3.6.1.4.1 . . . 1.2.3.1" is non-index information including a MIB value "V0" solely (see FIG. 1). Therefore, in the information table 52, an OID "1.3.6.1.4.1 . . . 1.2.3.1.0" and the MIB value "V0" are associated with each other.

A piece of information corresponding to a base ID "1.3.6.1.4.1 . . . 1.2.3.2" is index information including 28 MIB values "V1"-"V28" corresponding to 28 index values "1"-"28" (see FIG. 1). Therefore, in the information table 52, OIDs "1.3.6.1.4.1 . . . 1.2.3.2.1"-"1.3.6.1.4.1 . . . 1.2.3.2.28" are associated with the 28 MIB values "V1"-"V28", respectively. The 28 index values "1"-"28" are one-dimensional values (i.e., one-dimensional integers).

The index value may be represented by a two- or more-dimensional value. For example, a piece of information corresponding to a base ID "1.3.6.1.4.1 . . . 1.2.3.3" is index information including 43 MIB values "V1.1"-"V1.25" and "V2.1"-"V2.18" corresponding to 43 two-dimensional index values "1.1"-"1.25" and "2.1"-"2.18" (see FIG. 1). A piece of information corresponding to a base ID "1.3.6.1.4.1 . . . 1.2.3.4" is index information including a plurality of MIB values, e.g., "V1.1.1"-"V1.1.19" and "V1.2.1"-"V1.2.10"

corresponding to a plurality of three-dimensional index values "1.1.1"-"1.1.19" and "1.2.1"-"1.2.10" (see FIG. 1). Similarly, four-dimensional index values may be adopted. Hereinafter, the words "one-dimensional index information", "two-dimensional index information", and "three-dimensional index information" are also used in accordance with the dimensionality of the index value.

For example, the printer 50 may be configured to use two-dimensional index information as described below. It is assumed that the printer 50 is shared among a plurality of users. In this case, the printer 50 assigns a higher-digit value of the two-dimensional index value (e.g., the value "2" of the index value "2.3") to each user. The printer 50 further assigns a lower-digit value of the two-dimensional index value (e.g., the value "3" of the index value "2.3") to each user's information (e.g., a user name, or a password). Therefore, the printer 50 is configured to store each information related to the users by using the two-dimensional index information on a user basis.

In this illustrative embodiment, consecutive values (integers) are used as index values. That is, in a plurality of one-dimensional index values, the smallest value is "1" and the value is consecutively incremented by one, e.g., "2", "3", and so on. In a plurality of two-dimensional index values, the smallest value is "1.1" and a lower-digit value is consecutively incremented by one, e.g., "1.2", "1.3", and so on. A higher-digit value is also consecutively incremented by one, e.g., "1.1", "2.1", "3.1", and so on. Similarly, in a plurality of three- or more-dimensional index values, consecutive values are used.

In one example information table 52 lists OIDs such that values of base IDs become greater from top to bottom. For example, base IDs "1.3.6.1.4.1 . . . 1.2.3.1", "1.3.6.1.4.1 . . . 1.2.3.2", and "1.3.6.1.4.1 . . . 1.2.3.3" are listed in this order from top to bottom (see FIG. 1). Further, the information table 52 lists the OIDs such that index values corresponding to the respective OIDs become greater from top to bottom. For example, in one-dimensional index information (starting with a base ID "1.3.6.1.4.1 . . . 1.2.3.2"), index values "1", "2", . . . , and "28" are listed in this order from top to bottom (see FIG. 1). That is, OIDs listed in a lower position in the information table 52 have a greater value.

Figure 2:
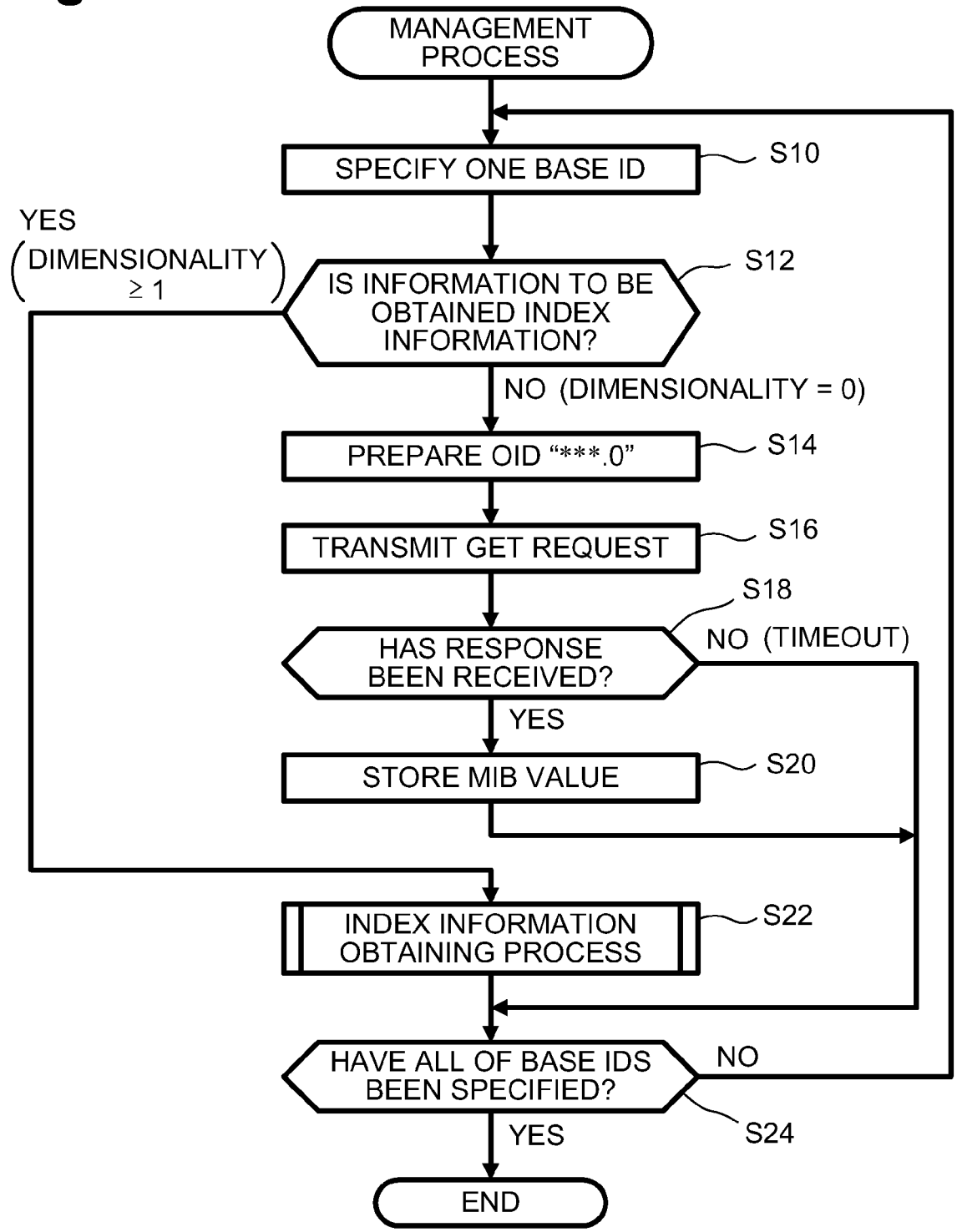
FIG. 2 is a flowchart depicting a management process performed by a management device in the first illustrative embodiment according to one or more aspects of the disclosure.

In one example vendor of the printer 50 predetermines, with respect to each base ID to be stored in the information table 52 of the printer 50, whether a piece of information corresponding to the base ID is non-index information or index information. Further, the vendor of the printer 50 predetermines dimensionality of each index information. The vendor of the printer 50 creates the dimensionality table 26 in accordance with the contents determined as described above, and prepares the management program for PC. That is, in the dimensionality table 26, each base ID is associated with a corresponding one of dimensionalities. A dimensionality "0" associated with a base ID "1.3.6.1.4.1 . . . 1.2.3.1" represents that a piece of information corresponding to the base ID is non-index information (Process performed by Management Device 10; FIG. 2)
With reference to FIG. 2, a management process performed by the management device 10 will be described in detail below. For example, when a user of the management device 10 operates the operating device 12 to input an instruction for obtaining information (e.g., each MIB value) from the printer 50 into the management device 10, the control device 20 starts the management process of FIG. 2 in accordance with the management program.

At step S10, the obtaining section 30 specifies a base ID from the dimensionality table 26. Hereinafter, the base ID specified at step S10 is also referred to as a "target base ID" and a specific value of the target base ID is represented by "***".

Then, at step S12, the obtaining section 30 determines whether a piece of information corresponding to the target base ID, i.e., information to be obtained, is index information or non-index information. More specifically, the obtaining section 30 reads the dimensionality associated with the target base ID from the dimensionality table 26. When the read dimensionality is "0", the obtaining section 30 determines that the information to be obtained is non-index information (NO at step S12) and the routine moves to step S14. When the read dimensionality is "1" or greater, the obtaining section 30 determines that the information to be obtained is index information (YES at step S12) and the routine moves to step S22.

At step S14, the preparing section 32 prepares an OID "*.0" by combining the target base ID "*" and a default value "0". At step S14, the preparing section 32 prepares the OID "*.0" only. For example, when the target base ID "*" is "1.3.6.1.4.1 . . . 1.2.3.1" (see FIG. 1), at step S14, the preparing section 32 prepares an OID "1.3.6.1.4.1 . . . 1.2.3.1.0". Then, at step S16, the transmitting section 34 transmits a GET request including the OID "***.0" prepared at step S14 to the printer 50.

The GET request transmitted at step S16 is a normal GET request but not a GETNEXT request or a GETBULK request. The normal GET request is implemented in SNMPv1. The GETBULK request is not implemented in SNMPv1 but implemented in SNMPv2 or SNMPv3. However, SNMPv2 and SNMPv3 offer a complicated security, and therefore, it is difficult to use SNMPv2 or SNMPv3. Accordingly, in this illustrative embodiment, the transmitting section 34 is configured to transmit a normal GET request in accordance with SNMPv1 at step S16. In the description below, at step S42 in FIG. 3, the transmitting section 34 transmits a GETNEXT request. The GETNEXT request is also implemented in SNMPv1. As described above, in this illustrative embodiment, the transmitting section 34 is configured to transmit one of a normal GET request and a GETNEXT request in accordance with the management program for SNMPv1 that is relatively easy to use.

Upon receipt of the GET request from the management device 10, the printer 50 determines whether a MIB value (hereinafter, referred to as a "target MIB value") corresponding to the OID "*.0" included in the GET request is stored in the information table 52. When the target MIB value is present in the information table 52, the printer 50 transmits a response including the OID "*.0" and the target MIB value to the management device 10. When the target MIB value is not present in the information table 52, the printer 50 transmits a response including information "No Such" to the management device 10. The information "No Such" represents that the target MIB value is not present in the information table 52.

At step S18, the obtaining section 30 monitors a receipt of a response from the printer 50. When a predetermined time period has passed without a receipt of a response from the printer 50 since the GET request was transmitted at step S16, the obtaining section 30 makes a negative determination at step S18 (NO at step S18) and the routine moves to step S24.

For example, when the target base ID is represented by a base ID "1.3.6.1.4.1 . . . 1.2.3.1" (see FIG. 1), at step S18, the obtaining section 30 receives a response including a target MIB value "V0" (YES at step S18S). In this case, at step S20, the obtaining section 30 stores the OID prepared at step S14 and the target MIB value included in the response in a predetermined storage area of the memory 24 in association with each other. With this configuration, the obtaining section 30 obtains non-index information from the printer 50 and stores the non-index information in the predetermined storage area. When the response includes "No Such", at step S20, the obtaining section 30 stores the OID prepared at step S14 and information representing "No Such" in the predetermined storage area in association with each other. After step S20, the routine moves to step S24.

Figure 3:
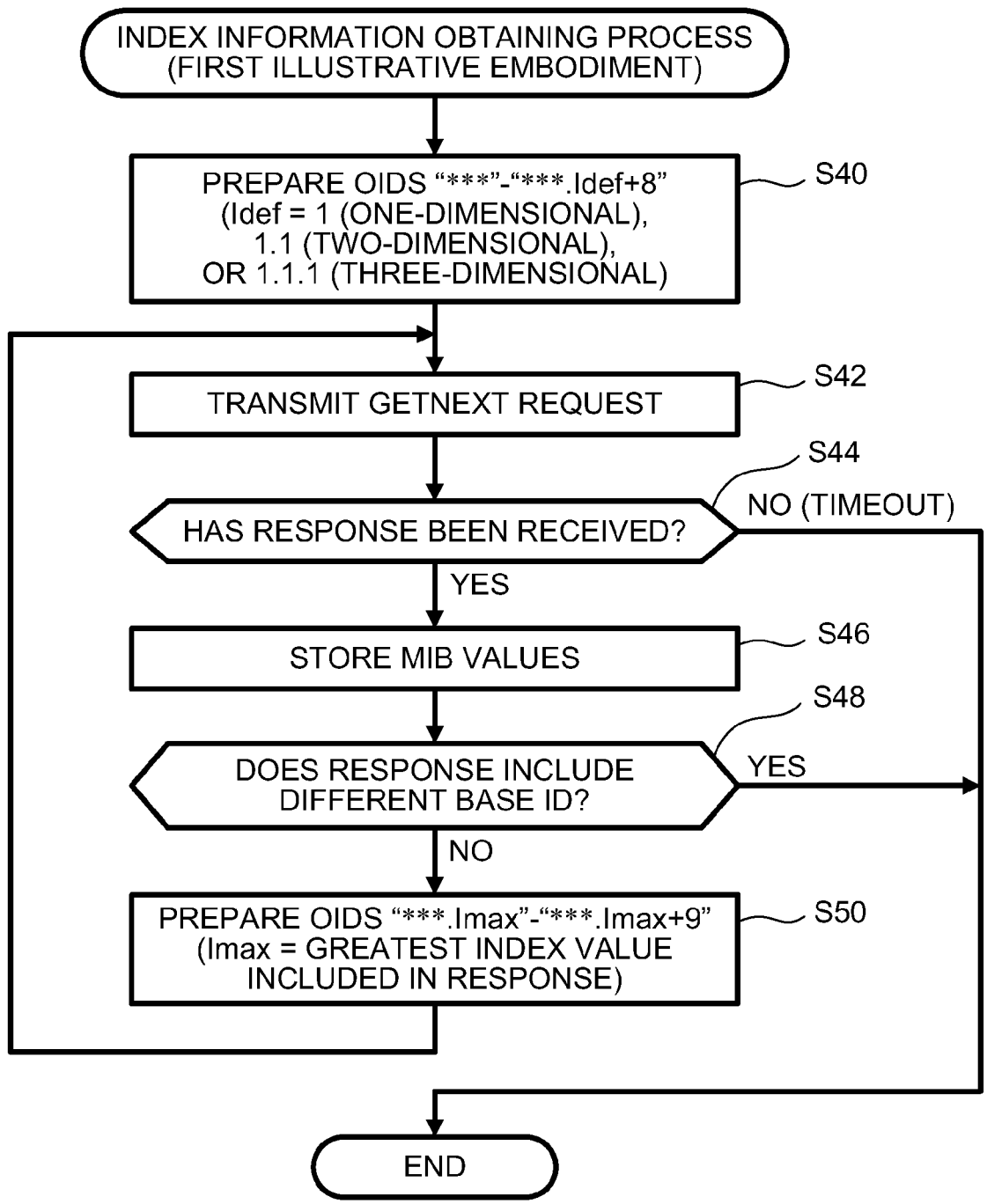
FIG. 3 is a flowchart depicting an index information obtaining process in the first illustrative embodiment according to one or more aspects of the disclosure.

When the information to be obtained is index information (YES at step S12), at step S22, the obtaining section 30 performs an index information obtaining process (see FIG. 3). After step S22, the routine moves to step S24.

At step S24, the obtaining section 30 determines whether all of the base IDs included in the dimensionality table 26 have been specified at step S10. When all of the base IDs have not been specified yet (NO at step S24), the routine moves back to step S10 and the obtaining section 30 specifies the next target base ID included in the dimensionality table 26. When all of the base IDs included in the dimensionality table 26 have been specified (YES at step S24), the management process of FIG. 2 is ended. Although omitted from the drawings, the control device 20 displays each information stored in the predetermined storage area on the display device 14 after the management process of FIG. 2 ends. By doing so, the user is allowed to browse various information about the printer 50.

(Index Information Obtaining Process; FIG. 3) With reference to FIG. 3, the index information obtaining process performed at step S22 in FIG. 2 will be described. At step S40, first, the preparing section 32 prepares a target base ID "*" only. Further, the preparing section 32 identifies a dimensionality associated with the target base ID "*" with reference to the dimensionality table 26. Then, the preparing section 32 prepares nine OIDs by using the identified dimensionality. More specifically, the preparing section 32 prepares the nine OIDs by combining a target base ID "***" and each of nine consecutive index values "Idef"-"Idef+8". "Idef" represents the smallest index value represented by the identified dimensionality. For example, when the identified dimensionality is one, "Idef" is "1". Similar to this, when the identified dimensionality is two, "Idef" is "1.1", and when the identified dimensionality is three, "Idef" is "1.1.1".

For example, when the identified dimensionality is one, at step S40, the preparing section 32 prepares a target base ID "*" and nine OIDs "*.1", "*.2", . . . , and "*.9". Hereinafter, the target base ID "*" itself prepared at step S40 is also referred to as the "OID", and each OID prepared at step S40 is referred to as a "target OID". Therefore, in the above-described example, at step S40, the preparing section 32 prepares ten target OIDs "*", "*.1", "*.2", . . . , and "*.9". Similar to this, for example, when the identified dimensionality is two, at step S40, the preparing section 32 prepares ten target OIDs "*", "*.1.1", "*.1.2", . . . , and "*.1.9". For example, when the identified dimensionality is three, at step S40, the preparing section 32 prepares ten target OIDs "*", "*.1.1.1", "*.1.1.2", . . . , and "***.1.1.9".

Next, at step S42, the transmitting section 34 transmits a GETNEXT request including the ten target OIDs prepared at step S40 to the printer 50. The GETNEXT request is used to obtain a MIB value corresponding to a next immediate OID of the target OID. The next immediate OID will be described in detail below.

Upon receipt of the GETNEXT request from the management device 10, the printer 50 identifies a next immediate OID of the target OID and a MIB value corresponding to the next immediate OID, for each of the ten target OIDs included in the GETNEXT request. That is, the printer 50 identifies ten MIB values as well as ten OIDs, respectively. In this illustrative embodiment, the next immediate OID is defined as described below.

When a target OID is represented by a target base ID "*" only, the next immediate OID is the smallest OID having the target base ID in all of the OIDs that are present in the information table 52. For example, when a target OID is represented by "1.3.6.1.4.1 . . . 1.2.3.2" (i.e., "*") corresponding to the one-dimensional index information depicted in FIG. 1, the next immediate OID is an OID "1.3.6.1.4.1 . . . 1.2.3.2.1" (i.e., "*.1"). For example, when a target OID is represented by "1.3.6.1.4.1 . . . 1.2.3.3" (i.e., "*") corresponding to the two-dimensional index information depicted in FIG. 1, the next immediate OID is an OID "1.3.6.1.4.1 . . . 1.2.3.3.1.1" (i.e., "***.1.1").

When a target OID is represented by a combination of a base ID and an index value, the next immediate OID is the smallest OID in all of the OIDs that are present in the information table 52, wherein the value of the smallest OID is greater than the value of the target OID. For example, when a target OID is represented by "1.3.6.1.4.1 . . . 1.2.3.2.1" (i.e., "*.1") corresponding to the one-dimensional index information depicted in FIG. 1, the next immediate OID is an OID "1.3.6.1.4.1 . . . 1.2.3.2.2" (i.e., "*.2"). For example, when a target OID is represented by "1.3.6.1.4.1 . . . 1.2.3.2.28" (i.e., "*.28") corresponding to the one-dimensional index information depicted in FIG. 1, the "next immediate OID" is an OID "1.3.6.1.4.1 . . . 1.2.3.3.1.1" (i.e., "###.1.1"). In this description, "###" (e.g., "1.3.6.1.4.1 . . . 1.2.3.3") represents a base ID listed below a target base ID "*" (e.g., "1.3.6.1.4.1 . . . 1.2.3.2") in the information table 52 (i.e., the next immediate base ID of the target base ID). For example, when a target OID is represented by "1.3.6.1.4.1 . . . 1.2.3.2.29" (i.e., "***.29") that is not present in the information table 52, the next immediate OID is an OID "1.3.6.1.4.1 . . . 1.2.3.3.1.1" (i.e., "###.1.1").

When the ten target OIDs are represented by "*" (e.g., "1.3.6.1.4.1 . . . 1.2.3.2")"-"*.9", respectively, corresponding the one-dimensional index information depicted in FIG. 1, the printer 50 identifies ten OIDs "*.1"-"*.10" respectively and ten MIB values "V1"-"V10" respectively. For example, when the ten target OIDs are represented by "*.20"-"*.29", respectively, corresponding to the one-dimensional index information depicted in FIG. 1, the printer 50 identifies OIDs "*.21"-"*.28" for eight target OIDs "*.20"-"*.27" of the ten target OIDs respectively, and identifies MIB values "V21"-"V28" respectively. Further, the printer 50 identifies the same OIDs "###.1.1 (e.g., an OID "1.3.6.1.4.1 . . . 1.2.3.3.1.1")" and "###.1.1" for the other two target OIDs "*.28" and "*.29" of the ten target OIDs respectively, and identifies the same MIB values "V1.1" and "V1.1" respectively. After that, the printer 50 transmits a response including the identified ten OIDs and the identified ten MIB values to the management device 10.

At step S44, the obtaining section 30 monitors a receipt of a response from the printer 50. When a response has not been received (NO at step S44), the index information obtaining process of FIG. 3 is ended. When a response has been received (YES at step S44), at step S46, the obtaining section 30 stores the ten OIDs included in the response and the ten MIB values included in the response in the predetermined storage area of the memory 24 in association with each other.

Then, at step S48, the obtaining section 30 determines whether the response includes an OID including a base ID that is different from the target base ID. As described above, for example, when the ten target OIDs are represented by "*" (e.g., "1.3.6.1.4.1 . . . 1.2.3.2")"-"*.9", respectively, corresponding to the one-dimensional index information depicted in FIG. 1, the response includes the ten OIDs "*.1"-"*.10". In this case, the response does not include an OID including a base ID that is different from the target base ID "***". Therefore, the obtaining section 30 makes a negative determination at step S48 (NO at step S48), and the routine moves to step S50.

On the other hand, for example, when the ten target OIDs are represented by "*.20 (e.g., "1.3.6.1.4.1 . . . 1.2.3.2.20")"-"*.29" corresponding to the one-dimensional index information depicted in FIG. 1, the response includes the ten OIDs "*.21"-"*.28", "###.1.1 (e.g., "1.3.6.1.4.1 . . . 1.2.3.3.1.1")", and "###.1.1". In this case, the response includes an OID including the base ID "###" (e.g., "1.3.6.1.4.1 . . . 1.2.3.3") that is different from the target base ID "***" (e.g., "1.3.6.1.4.1 . . . 1.2.3.2"). Therefore, the obtaining section 30 makes a positive determination at step S48 (YES at step S48), and the index information obtaining process of FIG. 3 is ended. When the obtaining 30 makes a positive determination at step S48 (YES at step S48), it means that all of a plurality of MIB values included in the index information have already been obtained. In this case, the index information obtaining process of FIG. 3 is ended.

At step S50, the preparing section 32 prepares ten target OIDs "*.Imax"-"*.Imax+9" by combining a target base ID "*" and each of ten consecutive index values "Imax"-"Imax+9". "Imax" represents the greatest index value included in the previous response received at step S44. More specifically, at step S50, first, the preparing section 32 identifies a greatest OID "*.Imax" having the greatest index value from the ten OIDs included in the previous response received at step S44. Then, the preparing section 32 prepares ten target OIDs "*.Imax"-"*.Imax+9" in ascending numeric order, starting with the identified greatest OID "***.Imax".

For example, when the previous response received at step S44 includes ten OIDs "*.1 (e.g., "1.3.6.1.4.1 . . . 1.2.3.2.1")"-"*.10 (e.g., "1.3.6.1.4.1 . . . 1.2.3.2.10")", the preparing section 32 identifies a greatest OID "*.10" and prepares ten target OIDs "*.10"-"*.19" in ascending numeric order, starting with the identified greatest OID "*.10". For example, when the previous response received at step S44 includes ten OIDs "*.1.1 (e.g., "1.3.6.1.4.1 . . . 1.2.3.3.1.1")"-"*.1.10 (e.g., "1.3.6.1.4.1 . . . 1.2.3.3.1.10")", the preparing section 32 identifies a greatest OID "*.1.10" and prepares ten target OIDs "*.1.10"-"*.1.19" in ascending numeric order, starting with the identified greatest OID "*.1.10".

Then, at step S42, the transmitting section 34 transmits a GETNEXT request including the ten target OIDs prepared at step S50 to the printer 50. Until a negative determination is made at step S44 (NO at step S44) or a positive determination is made at step S48 (YES at step S48), the processing of steps S42-S50 are repeatedly performed.

(Example of Obtaining One-Dimensional Index Information; FIG. 4) FIG. 4 illustrates an example that the management device 10 obtains 28 MIB values "V1"-"V28" corresponding to 28 one-dimensional index values "1"-"28" in accordance with the index information obtaining process of FIG. 3. Hereinafter, a GETNEXT request is simply referred to as a "request".

The management device 10 first prepares ten target OIDs "* (e.g., "1.3.6.1.4.1 . . . 1.2.3.2")"-"*.9" (at step S40 in FIG. 3) and transmits a request Req1 including the ten target OIDs "*"-"*.9" to the printer 50 (at step S42 in FIG. 3). As a consequence of the transmission of the request Req1, the management device 10 receives a response Res1 including ten OIDs "*.1"-"*.10" and ten MIB values "V1"-"V10" from the printer 50.

Then, the management device 10 prepares another ten target OIDs "*.10"-"*.19" (at step S50 in FIG. 3) and transmits a request Req2 including the ten target OIDs "*.10"-"*.19" to the printer 50 (at step S42 in FIG. 3). As a consequence of the transmission of the request Req2, the management device 10 receives a response Res2 including ten OIDs "*.11"-"*.20" and ten MIB values "V11"-"V20" from the printer 50.

After that, the management device 10 prepares still another ten target OIDs "*.20"-"*.29" (at step S50 in FIG. 3) and transmits a request Req3 including the ten target OIDs "*.20"-"*.29" to the printer 50 (at step S42 in FIG. 3). As a consequence of the transmission of the request Req3, the management device 10 receives a response Res3 including ten OIDs "*.21"-"*.28", "###.1.1 (e.g., "1.3.6.1.4.1 . . . 1.2.3.3.1.1")", and "###.1.1", and ten MIB values "V21"-"V28", "V1.1", and "V1.1" from the printer 50. That is, the response Res3 includes OIDs "###.1.1" including the base ID "### (e.g., "1.3.6.1.4.1 . . . 1.2.3.3")" that is different from the target base ID "*** (e.g., "1.3.6.1.4.1 . . . 1.2.3.2")". Therefore, the management device 10 makes a positive determination at step S48 in FIG. 3 (YES at step S48), and the index information obtaining process of FIG. 3 is ended.

If a management device is configured to transmit a request including one target OID only to the printer 50 but not to transmit a request including ten target OIDs (hereinafter, this configuration is referred to as a "comparative configuration"), the management device needs to transmit 28 requests to the printer 50 for obtaining 28 MIB values included in the one-dimensional index information from the printer 50. As opposed to this, according to this illustrative embodiment, as depicted in FIG. 4, the management device 10 transmits three requests, e.g., the requests Req1-Req3, to the printer 50 for obtaining 28 MIB values from the printer 50. Accordingly, the management device 10 may obtain index information more efficiently than the comparative configuration.

Figure 5:
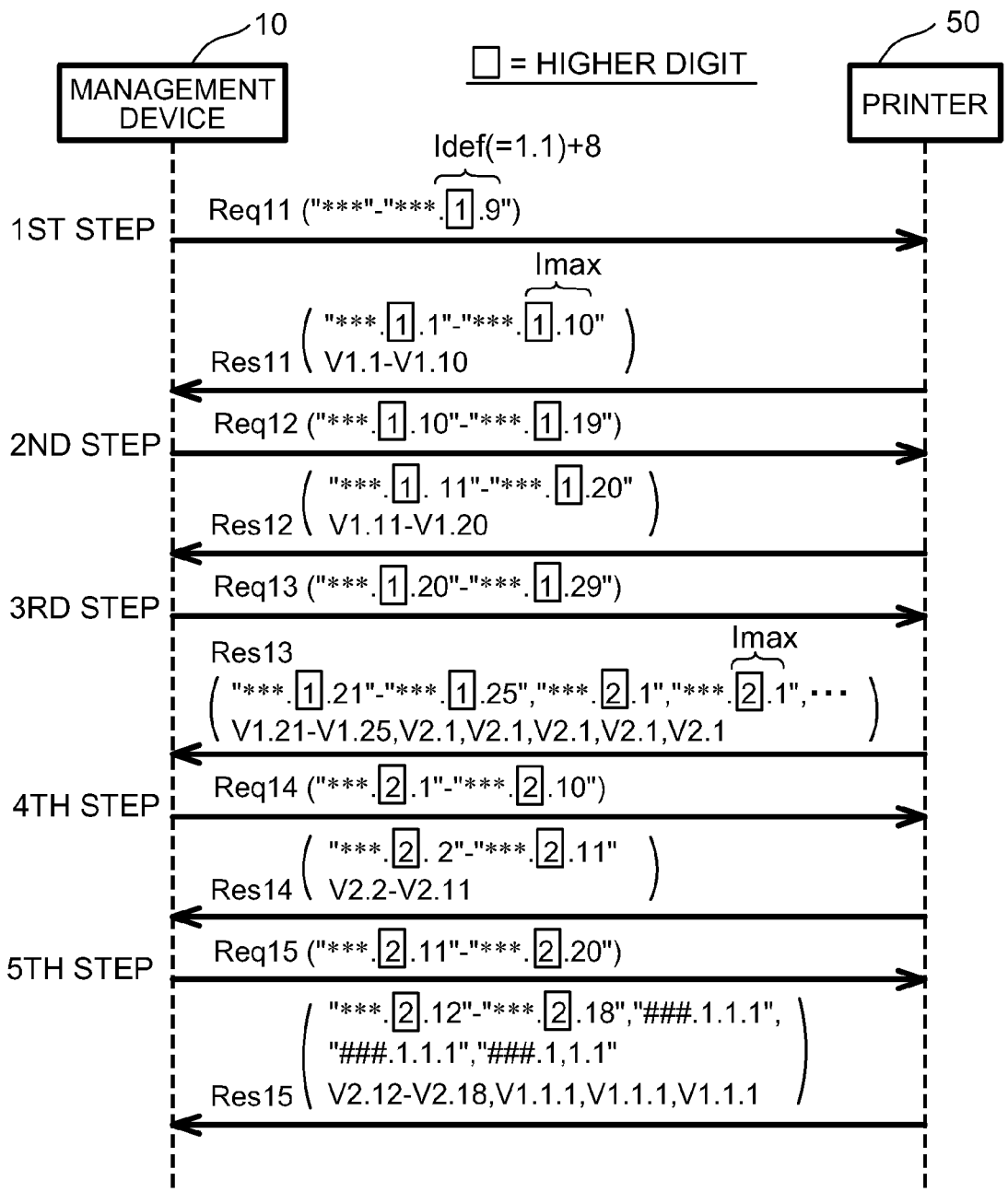
FIG. 5 is a sequence diagram depicting an example of obtaining two-dimensional index information in the first illustrative embodiment according to one or more aspects of the disclosure.

(Example of Obtaining Two-Dimensional Index Information; FIG. 5) FIG. 5 illustrates an example that the management device 10 obtains 43 MIB values "V1.1"-"V1.25" and "V2.1"-"V2.18" corresponding to 43 two-dimensional index values "1.1"-"1.25" and "2.1"-"2.18" in accordance with the index information obtaining process of FIG. 3. In FIG. 5, a value, which is enclosed in a box, of an index value of an OID represents a higher-digit value (i.e., a two-dimensional digit value) of the index value, and a value, which is not enclosed in a box, of the index value of the OID represents a lower-digit value (i.e., a one-dimensional digit value) of the index value.

First, the management device 10 prepares ten target OIDs "* (e.g., "1.3.6.1.4.1 . . . 1.2.3.3")"-"*.1.9" (at step S40 in FIG. 3). That is, the management device 10 prepares one OID "*" represented by a base ID only and nine OIDs "*.1.1"-"***.1.9" having nine index values "1.1"-"1.9", respectively. Here, each of the nine index values "1.1"-"1.9" has "1" in the higher digit (i.e., the two-dimensional digit) and one of "1"-"9" in the lower digit (i.e., the one-dimensional digit).

The management device 10 transmits a request Req11 including the ten target OIDs "*"-"*.1.9" to the printer 50 (at step S42 in FIG. 3). As a consequence of the transmission of the request Req11, the management device 10 receives a response Res11 including ten OIDs "*.1.1"-"*.1.10" and ten MIB values "V1.1"-"V1.10" from the printer 50. All of the index values "1.1"-"1.10" included in the response Res11 have "1" in the higher digit. That is, all of the index values "1.1"-"1.10" included in the response Res11 have "1" in the higher digit, wherein the higher-digit value of each of the index values "1.1"-"1.10" included in the response Res11 is the same as the higher-digit value of each of the index values "1.1", "1.2" etc. included in the request Req11. Hereinafter, a case where such a response, e.g., the response Res11, (i.e., a response including index values all of which have the same value in its higher digit as a higher-digit value of each index value included in a transmitted request) is received is also referred to as a "same value case".

The management device 10 identifies a greatest OID "*.1.10" having the greatest index value "1.10" from the ten OIDs "*.1.1"-"*.1.10" included in the response Res11, and prepares another ten target OIDs "*.1.10"-"*.1.19" in ascending numeric order, starting with the greatest OID "*.1.10" (at step S50 in FIG. 3). That is, in the above-described same value case, each of the newly prepared index values "1.10"-"1.19" has "1" in the higher digit, wherein the higher-digit value of each of the newly prepared index values "1.10"-"1.19" is the same as the higher-digit value of each of the index value "1.1"-"1.9" included in the previous request Req11. The smallest index value "1.10" of the newly prepared index values "1.10"-"1.19" is the next immediate value, or the next consecutive value, of the greatest index value "1.9" of the index values "1.1"-"1.9" included in the previous request Req11.

The management device 10 then transmits a request Req12 including the newly-prepared ten target OIDs "*.1.10"-"*.1.19" to the printer 50 (at step S42 in FIG. 3). As a consequence of the transmission of the request Req12, the management device 10 receives a response Res12 including ten OIDs "*.1.11"-"*.1.20" and ten MIB values "V1.11"-"V1.20" from the printer 50. The receipt of the response Res12 is the same value case.

The management device 10 identifies a greatest OID "*.1.20" having the greatest index value "1.20" from the ten OIDs "*.1.11"-"*.1.20" included in the response Res12, and prepares another ten target OIDs "*.1.20"-"*.1.29" in ascending numeric order, starting with the greatest OID "*.1.20" (at step S50 in FIG. 3).

Then, the management device 10 transmits a request Req13 including the newly-prepared ten target OIDs "*.1.20"-"*.1.29" to the printer 50 (at step S42 in FIG. 3). As a consequence of the transmission of the request Req13, the management device 10 receives a response Res13 including ten OIDs "*.1.21"-"*.1.25", "*.2.1", "*.2.1", "*.2.1", "*.2.1", and "***.2.1" and ten MIB values "V1.21"-"V1.25", "V2.1", "V2.1", "V2.1", "V2.1", and "V2.1" from the printer 50. The index value "2.1" included in the response Res13 has "2" in the higher digit, wherein the higher-digit value, e.g., "2", of the index values "2.1" included in the response Res13 is different from the higher-digit value, e.g. "1", of each of the index values "1.20"-"1.29" included the request Req13. Hereinafter, such a response, e.g., the response Res13, (i.e., a response including an index value whose higher-digit value is different from a higher-digit value of each index value included in a transmitted request) is also referred to as a "different value case". Further, such an index value, e.g., the index value "2.1", (i.e., an index value whose higher-digit value is different from a higher-digit value of each index value included in a transmitted request) is also referred to as a "specific index value".

Then, the management device 10 identifies a greatest OID "*.2.1" having the greatest index value "2.1" from the ten OIDs "*.1.21"-"*.1.25", "*.2.1" etc. included in the response Res13, and prepares ten target OIDs "*.2.1"-"*.2.10" in ascending numeric order, starting with the greatest OID "***.2.1" (at step S50 in FIG. 3). That is, in the different value case, each of the newly-prepared index values "2.1"-"2.10" has "2" in the higher digit, wherein the higher-digit value of each of the newly-prepared index values "2.1"-"2.10" is the same as the higher-digit value of the specific index value "2.1" included in the previous response Res13.

After that, the management device 10 transmits a request Req14 including the newly-prepared ten target OIDs "*.2.1"-"*.2.10" to the printer 50 (at step S42 in FIG. 3). As a consequence of the transmission of the request Req14, the management device 10 receives a response Res14 including ten OIDs "*.2.2"-"*.2.11" and ten MIB values "V2.2"-"V2.11" from the printer 50. The receipt of the response Res14 is the same value case.

Then, the management device 10 transmits a request Req15 including the newly-prepared ten target OIDs "*.2.11"-"*.2.20" to the printer 50 (at step S42 in FIG. 3). As a consequence of the transmission of the request Req15, the management device 10 receives a response Res15 including ten OIDs "*.2.12"-"*.2.18", "###.1.1.1 (e.g., "1.3.6.1.4.1 . . . 1.2.3.4.1.1.1")", "###.1.1.1", and "###.1.1.1", and ten MIB values "V2.12"-"V2.18", "V1.1.1", "V1.1.1", and "V1.1.1" from the printer 50. That is, the response Res15 includes the OID "###.1.1.1" including the base ID "###" (e.g., "1.3.6.1.4.1 . . . 1.2.3.4")" that is different from the target base ID "***" (e.g., "1.3.6.1.4.1 . . . 1.2.3.3")". Therefore, the management device 10 makes a positive determination at step S48 in FIG. 3 (YES at step S48), and the index information obtaining process of FIG. 3 is ended.

As depicted in FIG. 5, according to this illustrative embodiment, the management device 10 transmits five requests, e.g., the requests Req11-Req15, to the printer 50 for obtaining 43 MIB values included in the two-dimensional index information from the printer 50. Accordingly, the management device 10 may obtain index information efficiently.

Figure 6:
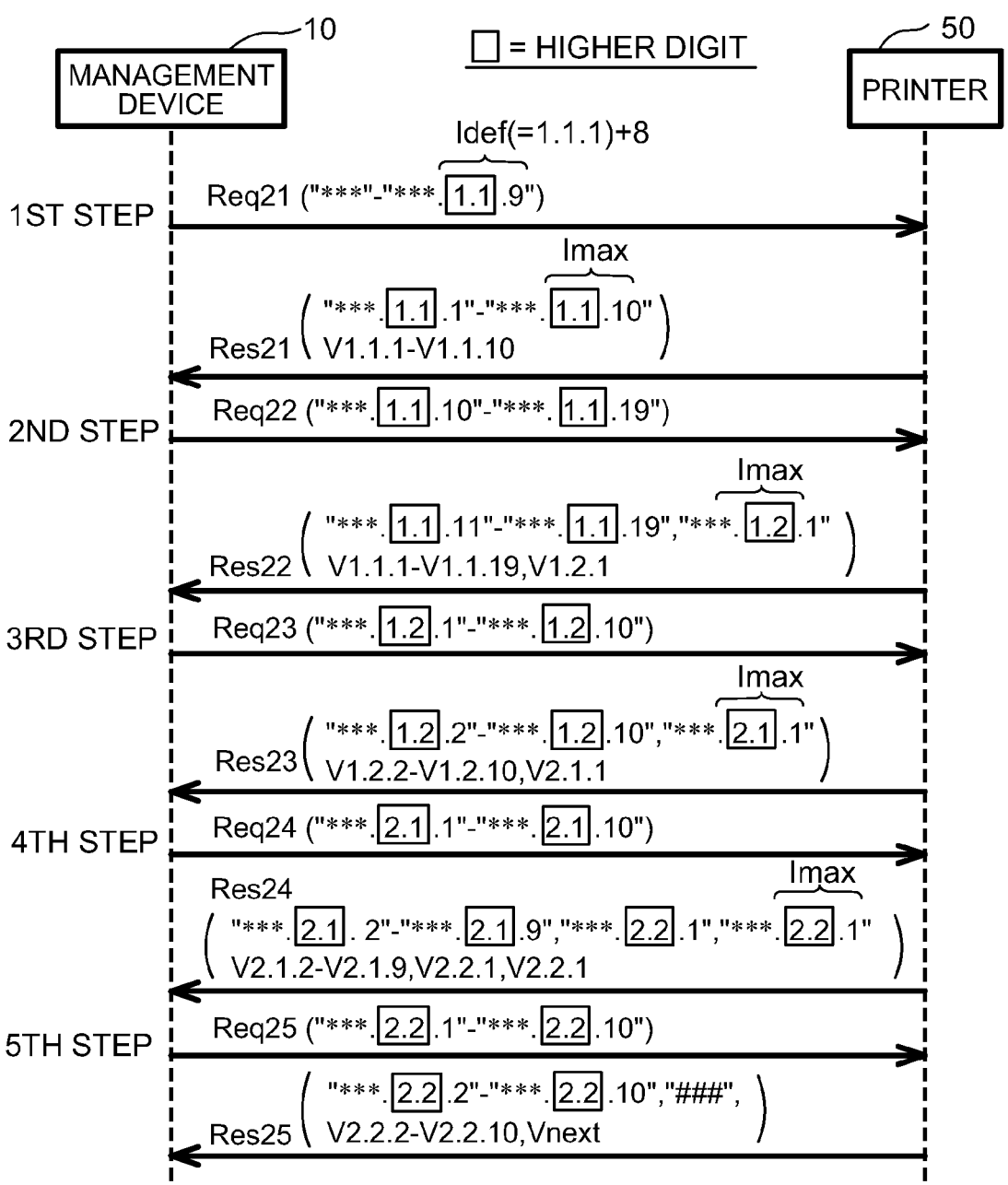
FIG. 6 is a sequence diagram depicting an example of obtaining three-dimensional index information in the first illustrative embodiment according to one or more aspects of the disclosure.

(Example of Obtaining Three-Dimensional Index Information; FIG. 6) FIG. 6 illustrates an example that the management device 10 obtains 48 MIB values "V1.1.1"-"V1.1.19" corresponding to 48 three-dimensional index values "1.1.1"-"1.1.19" in accordance with the index information obtaining process of FIG. 3. In FIG. 6, similar to FIG. 5, a value, which is enclosed in a box, of an index value of an OID represents a higher-digit value (i.e., a two-dimensional digit value or a three-dimensional digit value) and a value, which is not enclosed in a box, of the index value of the OID represents a lower-digit value (i.e., a one-dimensional digit value).

An example depicted in FIG. 6 is similar to the example depicted in FIG. 5, except that a two-dimensional digit value and a three-dimensional digit value of an index value are regarded as a higher-digit value in FIG. 6. For example, the higher-digit value of all of the index values "1.1.1"-"1.1.10" included in a response Res21 is "1.1" that is the same value as the higher-digit value, e.g., "1.1", of each of the index values "1.1.1"-"1.1.9" included in a request Req21. That is, the receipt of the response Res21 is the same value case. Therefore, each of the index values "1.1.10"-"1.1.19" included in the request Req22 has "1.1" in the higher digit, wherein the higher-digit value of each of the index values "1.1.10"-"1.1.19" included in the request Req22 is the same as the higher-digit value of each of the index values "1.1.1"-"1.1.10" included in the previous request Req21. The smallest index value "1.1.10" of the index values "1.1.10"-"1.1.19" included in the request Req22 is the next immediate value of the greatest index value "1.1.9" of the index values "1.1.1"-"1.1.9" included in the previous request Req21.

The higher-digit value of the index value "1.2.1" included in the response Res22 is "1.2" that is different from the higher-digit value, e.g., "1.1", of each of the index values "1.1.10"-"1.1.19" included in the request Req22. That is, the receipt of the response Res22 is the different value case, and the index value "1.2.1" is the specific index value. Therefore, each of the index values "1.2.1"-"1.2.10" included in the request Req23 has "1.2" in the higher digit, wherein the higher-digit value of each of the index values "1.2.1"-"1.2.10" included in the request Req23 is the same as the higher-digit value of the specific index value "1.2.10".

Similar to this, a receipt of a response Res23 and a receipt of a response Res24 are also the different value cases. Further, a response Res25 includes an OID "###" including a base ID "### (e.g., "1.3.6.1.4.1 . . . 1.2.3.5")" that is different from the target base ID "*** (e.g., "1.3.6.1.4.1 . . . 1.2.3.4")". Thus, the management device 10 makes a positive determination at step S48 in FIG. 3 (YES at step S48), and the index information obtaining process of FIG. 3 is ended.

As depicted in FIG. 6, according to this illustrative embodiment, the management device 10 transmits five requests, e.g., the requests Req21-Req25, to the printer 50 for obtaining 48 MIB values included in the three-dimensional index information from the printer 50. Accordingly, the management device 10 may obtain index information efficiently.

(Advantages of First Illustrative Embodiment) According to the first illustrative embodiment, as described above, the management device 10 may obtain index information efficiently. In particular, as depicted in FIGS. 5 and 6, for obtaining two- or more-dimensional index information, the management device 10 may prepare each OID to be included in the next request appropriately and obtain MIB values corresponding to the OIDs appropriately at once in both of the same value case and the different value case.

If a request includes more than ten OIDs, the management device 10 may obtain all MIB values from the printer 50 through less number of communications. For example, in the example depicted in FIG. 4, it is assumed that the management device 10 transmits a request including one hundred OIDs to the printer 50. Then, the management device 10 may obtain all of 28 MIB values from the printer 50 through one-time communication. However, if the management device 10 transmits a request including an extremely large number of OIDs (e.g., one hundred OIDs), a packet size of a response may be over an upper limit of transmission. If such a case happens, the response needs to be divided into several packets for transmission and thus communication efficiency may decrease. Further, a processing load on the printer 50 may also increase. Therefore, in the first illustrative embodiment, a request includes ten OIDs such that the number of OIDs included in the request does not become excessive.

As described above, the number of OIDs included in a request is set to an appropriate value so as not to become excessive. Thus, there is a higher possibility that the management device 10 will transmit a plurality of requests for obtaining a plurality of MIB values included in a piece of index information. For example, in the example depicted in FIG. 4, the management device 10 needs to transmit three requests. However, the management device 10 may determine that the one-dimensional index information includes 28 MIB values "V1"-"V28" corresponding to 28 index values "1"-"28" by obtaining each MIB value in accordance with the example depicted in FIG. 4. Accordingly, when the management device 10 (i.e., the obtaining section 30) performs the index information obtaining process for the second and subsequent times, the management device 10 may obtain the 28 MIB values "V1"-"V28" at once by transmitting a request including 28 OIDs "*"-"*.27" to the printer 50. Similarly, once the management device 10 determines the number of MIB values included in the two- or more-dimensional index information, the management device 10 may obtain the plurality of MIB values at once by transmitting a request including a plurality of OIDs to the printer 50 at the time of performing the index information obtaining process for the second and subsequent times. However, as described above, for example, when the printer 50 accumulatively stores the error history, the number of MIB values (i.e., the number of index values) included in the index information may be changed. Therefore, it may be preferable that the management device 10 perform the index information obtaining process of FIG. 3 for the second and subsequent times. With this configuration, the management device 10 may appropriately obtain one or more MIB values corresponding to one or more OIDs that have been newly stored in the printer 50.

(Correspondence) The printer 50 may be an example of a "target device". The base ID may be an example of a "target ID". The OID may be an example of a "combined ID". For example, in the two-dimensional index information of FIG. 5, the 43 index values may be an example of "a plurality of K-dimensional index values", and the 43 MIB values may be an example of "a plurality of pieces of partial target information".

For example, the request Req13 depicted in FIG. 5 may be an example of a "first GETNEXT request". In this case, the ten OIDs "*.1.20"-"*.1.29" may be an example of a "first group of an Ma number of combined IDs", the 10 index values "1.20"-"1.29" may be an example of an "Ma number of index values", and the higher-digit value "1" of each of the 10 index values "1.20"-"1.29" may be an example of a "first value". The ten OIDs "*.1.21"-"*.1.25", . . . , and "*.2.1" etc. included in the response Res13 may be an example of a "second group of an Ma number of combined IDs". The ten MIB values "V1.21"-"V1.25", . . . , and "V2.1" etc. included in the response Res13 may be an example of "Ma pieces of partial target information". The OID "*.2.1" may be an example of a "specific combined ID". The index value "2.1" may be an example of a "specific index value". The higher-digit value "2" of the index value "2.1" may be an example of a "second value". The MIB value "V2.1" may be an example of "specific partial target information". The request Req14 may be an example of a "second GETNEXT request". The ten OIDs "*.2.1"-"*.2.10" may be an example of an "Mb number of combined IDs".

For example, the request Req12 depicted in FIG. 5 may be another example of the "first GETNEXT request". In this case, the ten OIDs "*.1.10"-"*.1.19" may be an example of the "Ma number of combined IDs in the first group", and the ten index values "1.10"-"1.19" may be an example of the "Ma number of index values". The ten MIB values "V1.11"-"V1.20" included in the response Res12 may be an example of the "Ma pieces of partial target information". The request Req13 may be an example of a "third GETNEXT request". The ten OIDs "*.1.20"-"*.1.29" may be an example of an "Mc number of combined IDs".

Figure 7:
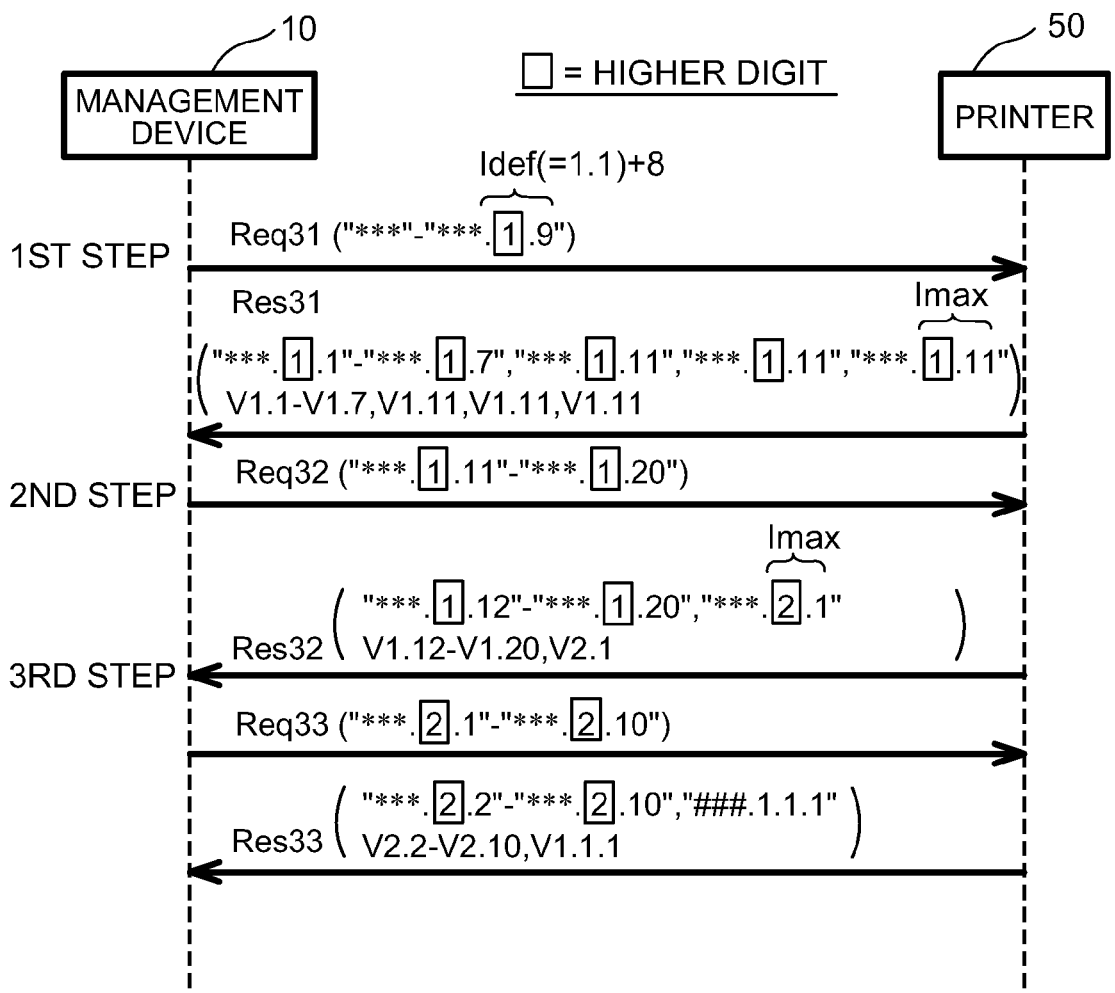
FIG. 7 is a sequence diagram depicting an example of obtaining two-dimensional index information in a variation of the first illustrative embodiment according to one or more aspects of the disclosure.

(Variation of First Illustrative Embodiment; FIG. 7) As described above, in the first illustrative embodiment, in the information table 52 stored in the printer 50, each OID that is a combination of a base ID and one of consecutive index values is to be used. In other embodiments, for example, even when each OID that is a combination of a base ID and one of non-consecutive index values is used in the information table 52, the index information obtaining process of FIG. 3 according to the first illustrative embodiment may be applied thereto.

For example, it is assumed that a plurality of MIB values corresponding to a plurality of OIDs depicted in FIG. 7 are obtained. The plurality of OIDs (i.e., the plurality of MIB values) do not include OIDs "*.1.8"-"*.1.10" (i.e., MIB values "V1.8"-"V1.10"). That is, each OID is a combination of a base ID "***" and one of non-consecutive index values "1.1"-"1.7" and "1.11"-"1.20".

First, the management device 10 transmits a request Req31 including ten target OIDs "*"-"*.1.9" to the printer 50 (at step S42 in FIG. 3) As a consequence of the transmission of the request Req31, the management device 10 receives a response Res31 including ten OIDs "*.1.1"-"*.1.7", "*.1.11", "*.1.11", and "***.1.11" and ten MIB values "V1.1"-"V1.7", "V1.11", "V1.11", and "V1.11", from the printer 50.

Then, the management device 10 identifies a greatest OID "*.1.11" having the greatest index value "1.11" from the ten OIDs included in the response Res31, and prepares another ten target OIDs "*.1.11"-"*.1.20" in ascending numeric order, starting with the greatest OID "*.1.11" (at step S50 in FIG. 3). After that, the management device 10 transmits a request Req32 including the newly-prepared ten target OIDs "*.1.11"-"*.1.20" to the printer 50 (at step S42 in FIG. 3). A response Res32, a request Req33, and a response Res33 that are to be transmitted or received by the management device 10 are similar to the example depicted in FIG. 5, for example.

As depicted in FIG. 7, the management device 10 may obtain each MIB value appropriately by performing the processing in accordance with the index information obtaining process of FIG. 3 although each OID that is a combination of a base ID and one of non-consecutive index values is used in the information table 52.

Second Illustrative Embodiment

In a second illustrative embodiment, an explanation will be given for the parts different from the first illustrative embodiment. In the second illustrative embodiment, the details of the index information obtaining process at step S22 in FIG. 2 are different from the index information obtaining process according to the first illustrative embodiment. When the information to be obtained is one-dimensional index information, the obtaining section 30 obtains each MIB value in accordance with the index information obtaining process of FIG. 3, similar to the first illustrative embodiment. When the information to be obtained is two-dimensional index information, the obtaining section 30 obtains each MIB value in accordance with the index information obtaining process of FIG. 8.

Figure 8:
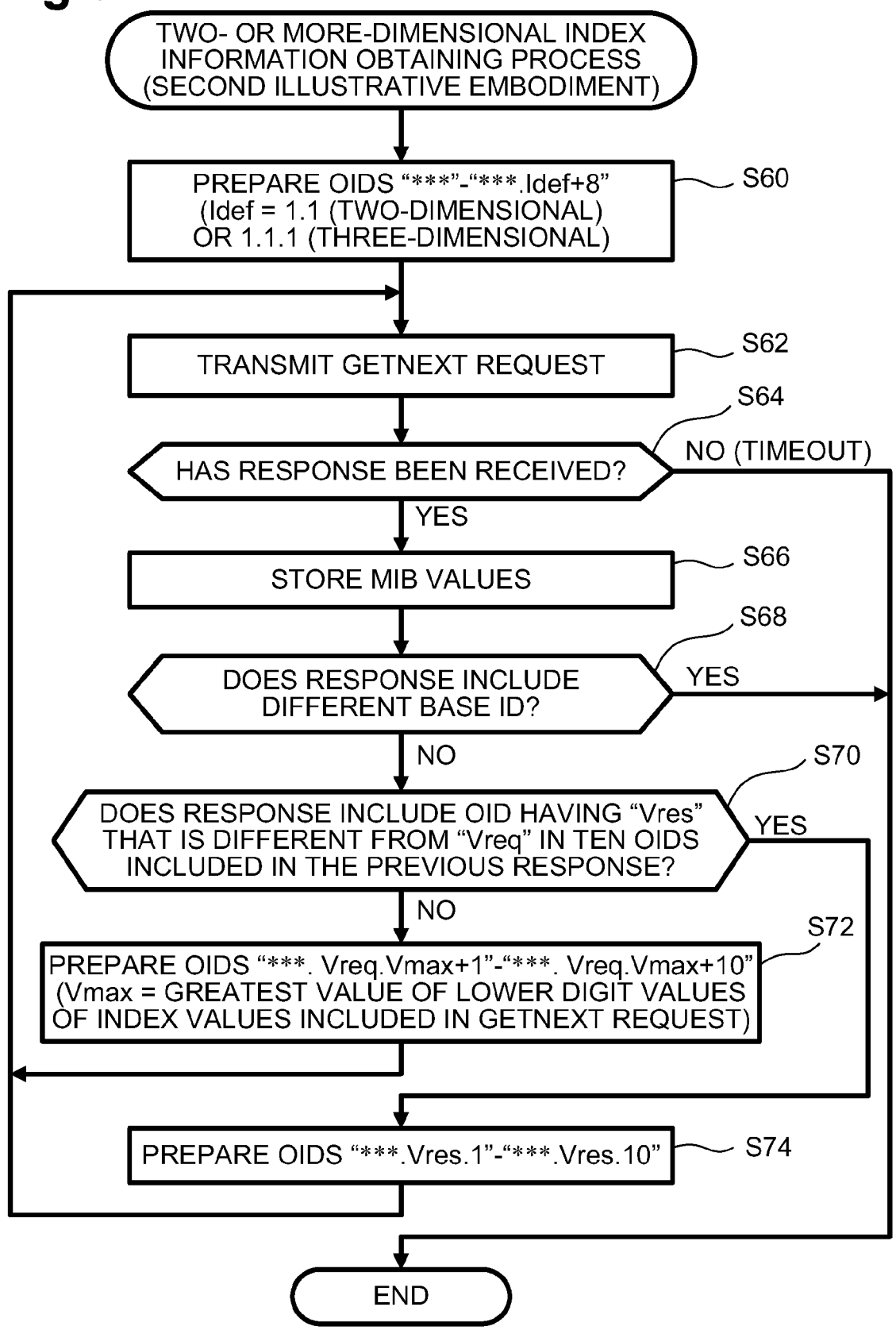
FIG. 8 is a flowchart depicting a two- or more-dimensional index information obtaining process in a second illustrative embodiment according to one or more aspects of the disclosure.

(Two- or more-Dimensional Index Information Obtaining Process; FIG. 8) The processing of steps S60-S68 in FIG. 8 is similar to the processing of steps S40-S48 in FIG. 3. When a negative determination is made at step S68 (NO at step S68), at step S70, the determining section 36 determines whether the response includes an OID having a specific index value (i.e., an index value having a higher-digit value that is different from the higher-digit value of each of the index values included in the request) in the ten OIDs included in the previous response at step S64. That is, the determining section 36 determines whether this case is the same value case (No at step S70) or the different value case (YES at step S70).

Hereinafter, the higher-digit value of each of the index values included in the request is referred to as "Vreq". Also, the higher-digit value of the specific index value included in the response is referred to as "Vres". For example, in requests Req41-Req43 of an example depicted in FIG. 9, "Vreq" is "1". Further, an index value "2.1" included in the response Res43 is the specific index value. In this case, "Vres" is "2".

When it is determined that this case is the same value case (NO at step S70), at step S72, the preparing section 32 prepares ten target OIDs "*.Vreq.Vmax+1"-"*.Vreq.Vmax+10" by combining a target base ID "*" and one of ten consecutive index values "Vreq.Vmax+1"-"Vreq.Vmax+10". "Vmax" represents the greatest index value included in the previous request transmitted at step S62. For example, at the time of completion of the communication of the request Req41 and the response Res41 in FIG. 9, "Vreq" is "1" and "Vmax" is "9". In this case, at step S72, the preparing section 32 prepares ten target OIDs "*.1.10"-"*.1.19". Then, at step S62, the transmitting section 34 transmits a request including the ten target OIDs "*.1.10"-"***.1.19" to the printer 50 (see the request Req42 in FIG. 9).

When it is determined that this case is the different value case (YES at step S70), at step S74, the preparing section 32 prepares ten target OIDs "*.Vres.1"-"*.Vres+10" by combining a target base ID "*" and one of ten consecutive index values "Vres.1"-"Vres.10". For example, at the time of completion of the communication of the request Req43 and the response Res43 in FIG. 9, "Vres" is "2". In this case, at step S74, the preparing section 32 prepares ten target OIDs "*.2.1"-"*.2.10". Then, at step S62, the transmitting section 34 transmits a request (e.g., a request Req44 in FIG. 9) including the ten target OIDs "*.2.1"-"***.2.10" to the printer 50.

Until a negative determination is made at step S64 (NO at step S64) or a positive determination is made at step S68 (YES at step S68), the processing of step S62-S74 are repeatedly performed. In the example depicted in FIG. 9, as the communications of the requests Req41-Req45 and the responses Res41-Res45 in FIG. 9 are completed, a positive determination is made at step S68 (YES at step S68).

(Advantages of Second Illustrative Embodiment) As apparent from a comparison between the example depicted in FIG. 9 according to the second illustrative embodiment and the example depicted in FIG. 5 according to the first illustrative embodiment, when the index information obtaining process of FIG. 8 according to the second illustrative embodiment is performed, the same results may be obtained as the case where the index information obtaining process of FIG. 3 according to the first illustrative embodiment is performed. According to the second illustrative embodiment, when the management device 10 obtains two- or more-dimensional index information, the management device 10 may appropriately prepare each OID to be included in the next request in both of the same value case (NO at step S70 in FIG. 8) and the different value case (YES at step S70 in FIG. 8), and obtain each MIB value appropriately.

Although the specific illustrative embodiments of the disclosure have been described, it should be understood that the detailed description is merely illustrative and does not limit the scope of the disclosure. Variations and modifications of the illustrative embodiments are also included within the scope of claims. For example, variations described below may be included.

(Modification 1) The values "Ma", "Mb", and "Mc" may be not limited to "10", and may be any value of an integer of 2 or greater. The values "Ma", "Mb", and "Mc" may not have the same value but have different values from each other.

(Modification 2) According to the second illustrative embodiment, at step S70 in FIG. 8, the determining section 36 determines whether an OID having the specific index value (i.e. an index value whose higher-digit value is "Vres") is included in the ten OIDs in the response. Instead of this, in other embodiments, for example, the determining section 36 may perform the determination of step S70 by using one of methods A-C described below. In the method A, the determining section 36 may make a positive determination at step S70 (YES at step S70) when the response includes two or more same OIDs (e.g., five same OIDs "*.2.1" included in the response Res43 in FIG. 9) in the ten OIDs included in the response. In the method B, the determining section 36 may make a positive determination at step S70 (YES at step S70) when the response includes two or more same MIB values (e.g., five same MIB values "V2.1" included in the response Res43 in FIG. 9) in the ten MIB values. In the method C, the determining section 36 may make a positive determination at step S70 (YES at step S70) when the lower-digits of the ten index values included in the response are not consecutive (e.g., in the response Res43 in FIG. 9, the index values "1.21"-"1.25" are consecutive but the index values "1.25" and "2.1" are not consecutive, and the index values "2.1" and "2.1" are not consecutive). That is, the determining section 36 may determine whether Ma pieces of partial target information include specific partial target information by using one of the method at step S70** in the second illustrative embodiment and the above-described methods A-C.

As described above, at step S50 of FIG. 3 in the first illustrative embodiment, the preparing section 32 identifies a greatest OID "*.Imax" having the greatest index value "Imax" and prepares OIDs "*.Imax"-"*.Imax+9" in ascending numeric order, starting with the greatest OID, without performing the determination (the determination at step S70 in FIG. 8) performed in the second illustrative embodiment. On the other hand, in the second illustrative embodiment, the preparing section 32 prepares OIDs in accordance with the determination at step S70 in FIG. 8 (at steps S72 and S74). Further, as described above, the determination at step S70 in FIG. 8** is not limited to the method according to the second illustrative embodiment but may be one of the methods A-C. Generally speaking, the methods according to the first illustrative embodiment and the second illustrative embodiment, and the methods A-C may be an example of "a function of preparing an Mb number of combined IDs".

(Modification 3) The target device may be not limited to printers, and may be other appropriate devices, for example, personal computers, servers, multifunction peripheral devices, copying machines, scanners, or facsimile machines may be included.

(Modification 4) In the above-described illustrative embodiments, the function of each section 30-36 may be implemented by the performance of the processing by the CPU 22 of the management device 10 in accordance with the software. In other embodiments, for example, at least a part of the function of each section 30-36 may be implemented by hardware, for example, a logical circuit.

In another embodiment a method may be provided, comprising: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; obtaining, as the result of the transmission of the first GETNEXT request, Ma number of pieces of partial target information and a second group of an Ma number of combined IDs corresponding to the Ma number of pieces of partial target information from the target device; identifying, using the obtained second group of the Ma number of combined IDs, a greatest combined ID having a greatest K-dimensional index value from the obtained second group of the Ma number of combined IDs; preparing an Mb number of combined IDs comprising the identified greatest combined ID, wherein Mb is an integer of 2 or greater, each of the Mb number of combined IDs is a combination of the target ID and one of Mb number of K-dimensional index values having K number of digits, each of the Mb number of K-dimensional index values has a second value in the highest K-1 number of its K number of digits and one of consecutive values in its lowest digit, and the second value is different from the first value; and transmitting to the target device a second GETNEXT request comprising the prepared Mb number of combined IDs.

In another embodiment a method may be provided, comprising: determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater; preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit; transmitting to the target device a first GETNEXT request comprising the prepared first group of the Ma number of combined IDs; determining whether a result of the transmission of the first GETNEXT request is a first case in which Ma pieces of partial target information obtained from the target device include specific partial target information corresponding to a specific combined ID that is a combination of the target ID and a specific index value having, in the highest K-1 number of its K number of digits, a second value that is different from the first value; preparing, after it is determined that the result of the transmission of the first GETNEXT request is the first case, an Mb number of combined IDs, wherein Mb is an integer of 2 or greater, each of the Mb number of combined IDs is a combination of the target ID and one of Mb number of K-dimensional index values having K number of digits, each of the Mb number of K-dimensional index values has the second value in a highest K-1 number of its K number of digits and one of consecutive index values in its lowest digit; and transmitting to the target device a second GETNEXT request comprising the prepared Mb number of combined IDs.

Further, the technical elements described in the specification and the drawings exhibit technical usability alone or in various combinations, and are not limited to those in the claims at the time of the disclosure. Furthermore, the techniques described as examples in the specification or drawings may achieve a plurality of objects simultaneously, and may have technical utility by achieving any of these objects.

What is claimed is:

1. A management device comprising:
a processor;
a memory storing computer-readable instructions that, when executed by the processor, cause the management device to perform:
determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater;
preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit;
transmitting to the target device a first GETNEXT request comprising the prepared first group of the Ma number of combined IDs;
obtaining, as the result of the transmission of the first GETNEXT request, Ma number of pieces of partial target information and a second group of an Ma number of combined IDs corresponding to the Ma number of pieces of partial target information from the target device;
identifying, using the obtained second group of the Ma number of combined IDs, a greatest combined ID having a greatest K-dimensional index value from the obtained second group of the Ma number of combined IDs;
preparing an Mb number of combined IDs comprising the identified greatest combined ID, wherein Mb is an integer of 2 or greater, each of the Mb number of combined IDs is a combination of the target ID and one of Mb number of K-dimensional index values having K number of digits, each of the Mb number of K-dimensional index values has a second value in the highest K-1 number of its K number of digits and one of consecutive values in its lowest digit, and the second value is different from the first value; and
transmitting to the target device a second GETNEXT request comprising the prepared Mb number of combined IDs.

2. The management device according to claim 1, wherein the table lists a plurality of IDs, and each of the plurality of IDs is associated with dimensionality data that represents dimensionality of a plurality of index values corresponding to a plurality of pieces of partial information included in information corresponding to the respective ID,
and wherein the determining whether target information corresponding to the target ID is K-dimensional index information is performed by using the dimensionality data associated with the target ID.

3. The management device according to claim 1, wherein Ma=Mb.

4. A management device comprising:
a processor;
a memory storing computer-readable instructions that, when executed by the processor, cause the management device to perform:
determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater;
preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit;
transmitting to the target device a first GETNEXT request comprising the prepared first group of the Ma number of combined IDs;
determining whether a result of the transmission of the first GETNEXT request is a first case in which Ma pieces of partial target information obtained from the target device include specific partial target information corresponding to a specific combined ID that is a combination of the target ID and a specific index value having, in the highest K-1 number of its K number of digits, a second value that is different from the first value;
preparing, after it is determined that the result of the transmission of the first GETNEXT request is the first case, an Mb number of combined IDs, wherein Mb is an integer of 2 or greater, each of the Mb number of combined IDs is a combination of the target ID and one of Mb number of K-dimensional index values having K number of digits, each of the Mb number of K-dimensional index values has the second value in a highest K-1 number of its K number of digits and one of consecutive index values in its lowest digit; and
transmitting to the target device a second GETNEXT request comprising the prepared Mb number of combined IDs.

5. The management device according to claim 4, wherein:
the determining whether the result of the transmission of the first GETNEXT request is the first case further comprises determining whether the result of the transmission of the first GETNEXT request is a second case in which the Ma pieces of partial target information do not include the specific partial target information; and
wherein the computer-readable instructions, when executed by the processor, cause the management device to perform:
preparing, after it is determined that the result of the transmission of the first GETNEXT request is the second case, an Mc number of combined IDs, wherein Mc is an integer of 2 or greater, each of the Mc number of combined IDs is a combination of the target ID and one of an Mc number of K-dimensional index values having K number of digits, and each of the Mc number of K-dimensional index values has the first value in a highest K-1 number of its K number of digits and one of consecutive values in its lowest digit, and a smallest index value of the Mc number of K-dimensional index values is a next consecutive value of a greatest index value of the Ma number of K-dimensional index values included in the first GETNEXT request; and
transmitting to the target device another GETNEXT request comprising the prepared Mc number of combined IDs.

6. The management device according to claim 4, wherein Ma=Mb.

7. The management device according to claim 4, wherein the computer-readable instructions, when executed by the processor, cause the management device to perform obtaining the Ma pieces of partial target information and a second group of an Ma number of combined IDs corresponding to the Ma pieces of partial target information from the target device as the result of the transmission of the first GETNEXT request, and the determining whether the result of the transmission of the first GETNEXT request is the first case comprises determining whether the Ma number of combined IDs in the second group include the specific combined ID.

8. The management device according to claim 4, wherein the table lists a plurality of IDs, and each of the plurality of IDs is associated with dimensionality data that represents dimensionality of a plurality of index values corresponding to a plurality of pieces of partial information included in information corresponding to the respective ID, and wherein the determining whether target information corresponding to the target ID is K-dimensional index information is performed by using the dimensionality data associated with the target ID.

9. A computer-readable storage medium storing computer-readable instructions that, when executed, cause a processor to perform:

determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater;

preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit;

transmitting to the target device a first GETNEXT request comprising the prepared first group of the Ma number of combined IDs;

obtaining, as the result of the transmission of the first GETNEXT request, Ma number of pieces of partial target information and a second group of an Ma number of combined IDs corresponding to the Ma number of pieces of partial target information from the target device;

identifying, using the obtained second group of the Ma number of combined IDs, a greatest combined ID having a greatest K-dimensional index value from the obtained second group of the Ma number of combined IDs;

preparing an Mb number of combined IDs comprising the identified greatest combined ID, wherein Mb is an integer of 2 or greater, each of the Mb number of combined IDs is a combination of the target ID and one of Mb number of K-dimensional index values having K number of digits, each of the Mb number of K-dimensional index values has a second value in the highest K-1 number of its K number of digits and one of consecutive values in its lowest digit, and the second value is different from the first value; and transmitting to the target device a second GETNEXT request comprising the prepared Mb number of combined IDs.

10. The computer-readable storage medium according to claim 9, wherein the table lists a plurality of IDs, and each of the plurality of IDs is associated with dimensionality data that represents dimensionality of a plurality of index values corresponding to a plurality of pieces of partial information included in information corresponding to the respective ID, and wherein the determining whether target information corresponding to the target ID is K-dimensional index information is performed by using the dimensionality data associated with the target ID.

11. The computer-readable storage medium according to claim 9, wherein Ma=Mb.

12. A computer-readable storage medium storing computer-readable instructions that, when executed, cause a processor to perform:

determining, with reference to a table, whether target information to be obtained, from a target device, corresponding to a target ID is K-dimensional index information comprising a plurality of pieces of partial information corresponding to a plurality of K-dimensional index values, wherein K is an integer of 2 or greater;

preparing, after it is determined that the target information is K-dimensional index information, a first group of an Ma number of combined IDs, wherein Ma is an integer of 2 or greater, each of the Ma number of combined IDs in the first group is a combination of the target ID and one of Ma number of K-dimensional index values having K number of digits, and each of the Ma number of K-dimensional index values has a first value in a highest K-1 number of its K number of digits and one of consecutive values in its lowest digit;

transmitting to the target device a first GETNEXT request comprising the prepared first group of the Ma number of combined IDs;

determining whether a result of the transmission of the first GETNEXT request is a first case in which Ma pieces of partial target information obtained from the target device include specific partial target information corresponding to a specific combined ID that is a combination of the target ID and a specific index value having, in the highest K-1 number of its K number of digits, a second value that is different from the first value;

preparing, after it is determined that the result of the transmission of the first GETNEXT request is the first case, an Mb number of combined IDs, wherein Mb is an integer of 2 or greater, each of the Mb number of combined IDs is a combination of the target ID and one of Mb number of K-dimensional index values having K number of digits, each of the Mb number of K-dimensional index values has the second value in a highest K-1 number of its K number of digits and one of consecutive index values in its lowest digit; and transmitting to the target device a second GETNEXT request comprising the prepared Mb number of combined IDs.

13. The computer-readable storage medium according to claim 12, wherein:

the determining whether the result of the transmission of the first GETNEXT request is the first case further comprises determining whether the result of the transmission of the first GETNEXT request is a second case in which the Ma pieces of partial target information do not include the specific partial target information; and wherein the computer-readable instructions, when executed, further cause the processor to perform:

preparing, after it is determined that the result of the transmission of the first GETNEXT request is the second case, an Mc number of combined IDs, wherein Mc is an integer of 2 or greater, each of the Mc number of combined IDs is a combination of the target ID and one of an Mc number of K-dimensional index values having K number of digits, and each of the Mc number of K-dimensional index values has the first value in a highest K-1 number of its K number of digits and one of consecutive values in its lowest digit, and a smallest index value of the Mc number of K-dimensional index values is a next consecutive value of a greatest index value of the Ma number of K-dimensional index values included in the first GETNEXT request; and transmitting to the target device another GETNEXT request comprising the prepared Mc number of combined IDs.

14. The computer-readable storage medium according to claim 12, wherein Ma=Mb.

15. The computer-readable storage medium according to claim 12, wherein the computer-readable instructions, when executed, further cause the processor to perform obtaining the Ma pieces of partial target information and a second group of an Ma number of combined IDs corresponding to the Ma pieces of partial target information from the target device as the result of the transmission of the first GETNEXT request, and the determining whether the result of the transmission of the first GETNEXT request is the first case comprises determining whether the Ma number of combined IDs in the second group include the specific combined ID.

16. The computer-readable storage medium according to claim 12, wherein the table lists a plurality of IDs, and each of the plurality of IDs is associated with dimensionality data that represents dimensionality of a plurality of index values corresponding to a plurality of pieces of partial information included in information corresponding to the respective ID, and wherein the determining whether target information corresponding to the target ID is K-dimensional index information is performed by using the dimensionality data associated with the target ID.

* * * * *